(12) United States Patent
Hewett et al.

(10) Patent No.: US 11,144,092 B2
(45) Date of Patent: Oct. 12, 2021

(54) COMPUTING DEVICE CONNECTION MECHANISM

(71) Applicant: Microsoft Technology Licensing, LLC, Redmond, WA (US)

(72) Inventors: Anthony James Hewett, Duvall, WA (US); Katherine Margaret Bailey, Seattle, WA (US); Ketan R. Shah, Redmond, WA (US); Yajing Liu, Kirkland, WA (US); Karsten Aagaard, Monroe, WA (US); Scott Jeffrey Korn, Seattle, WA (US); Christopher Alan Schafer, Redmond, WA (US); Cesar Ambriz Rios, San Francisco, CA (US); Alex Sai Cheong Cheng, Steilacoom, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/457,000

(22) Filed: Jun. 28, 2019

(65) Prior Publication Data

US 2020/0409414 A1 Dec. 31, 2020

(51) Int. Cl.
*G06F 1/16* (2006.01)
*G06F 3/02* (2006.01)
*H01R 13/62* (2006.01)

(52) U.S. Cl.
CPC ............. *G06F 1/1632* (2013.01); *G06F 3/02* (2013.01); *H01R 13/6205* (2013.01)

(58) Field of Classification Search
CPC ...... G06F 1/1632; G06F 3/02; H01R 13/6205
See application file for complete search history.

(56) References Cited

U.S. PATENT DOCUMENTS 9,075,566 B2 * 7/2015 Whitt, III ............... G06F 1/1684
9,167,711 B2 * 10/2015 Lee ......................... G06F 1/1626
(Continued)

FOREIGN PATENT DOCUMENTS

WO 2014120966 A1 8/2014

OTHER PUBLICATIONS

"International Search Report and Written Opinion Issued in PCT Application No. PCT/US2020/031959", dated Jul. 10, 2020, 12 Pages.

*Primary Examiner* — Rockshana D Chowdhury
(74) *Attorney, Agent, or Firm* — Rainier Patents, P.S.

(57) ABSTRACT

Aspects of the present disclosure include connection mechanisms for a peripheral computing device to connect with a mobile computing device. The peripheral computing device may include a device interface component that defines part of the connection mechanisms, and an electrical connection protrusion extending from the device interface component and configured to insert in a corresponding electrical receptacle of a computing device. The device interface component may also include a magnetically connectable docking member configured to magnetically attract or to be magnetically attracted to a corresponding docking component on the computing device. The device interface component may further include a support rail configured to support the electrical connection protrusion and the magnetically connectable docking member. The support rail may comprise a shoulder configured to define a pivot point to guide connecting the peripheral computing device with the computing device.

20 Claims, 11 Drawing Sheets

(56) References Cited

U.S. PATENT DOCUMENTS

| | | | | |
|---|---|---|---|---|
| 10,088,864 B2* | 10/2018 | Aoki | ............ | G06F 1/1683 |
| 2014/0211445 A1* | 7/2014 | Hirai | ............ | G06F 1/1654 |
| | | | | 361/809 |
| 2015/0049426 A1* | 2/2015 | Smith | ............ | G06F 1/1628 |
| | | | | 361/679.27 |
| 2016/0062484 A1* | 3/2016 | Sugiura | ............ | G06F 3/0202 |
| | | | | 345/156 |
| 2016/0179142 A1* | 6/2016 | Liang | ............ | G06F 1/1679 |
| | | | | 361/679.17 |
| 2017/0045917 A1 | 2/2017 | Rosen et al. | | |
| 2017/0068281 A1* | 3/2017 | Smith | ............ | G06F 1/1656 |
| 2017/0153664 A1 | 6/2017 | Tsai et al. | | |

* cited by examiner

COMPUTING DEVICE CONNECTION MECHANISM

BACKGROUND

The present disclosure relates to connection mechanism, and more particularly, to a connection mechanism between two computing devices or between two computing device components, such as a computing device or display and keyboard.

Keyboards are an important and popular input mechanism for providing input to a variety of computing devices. In order to keep up with consumer demand for smaller and more portable computing devices, keyboard designs have moved toward correspondingly thinner and smaller designs. Some keyboard designs include keyboards that are attachable/detachable to/from the computing devices. Detachable keyboards allow quick physical connection and disconnection to the computing devices. And, in some cases, detachable keyboards may provide additional functions, such as a cover for the computing devices or a supporting structure, such as to assist in propping up the computing devices for display. Detachable keyboards may allow users to arrange the keyboards and displays in numerous typing and viewing angles according to a user need. Due to the flexibility of some detachable keyboards, arrangement of the keyboard and computing devices for some typing orientations and viewing angles may result in physical disconnections between the keyboards and the computing devices.

Accordingly, there is a need in the art for improvements to connection mechanisms between computing devices and keyboards or other computing input devices.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In an implementation, a peripheral computing device is disclosed. The peripheral computing device may include an input portion configured to receive input for a computing device. The peripheral computing device may also include a device interface component connected to the input portion and configured to connect to the computing device. The device interface component may include an electrical connection protrusion extending from the device interface component and configured to insert in a corresponding electrical receptacle of a computing device. The device interface component may also include a magnetically connectable docking member configured to magnetically attract or to be magnetically attracted to a corresponding docking component on the computing device. The device interface component may also include a support rail configured to support the electrical connection protrusion and the magnetically connectable docking member, the support rail comprising a shoulder extending from a same surface of the device interface component as the electrical connection protrusion and configured to define a pivot point to guide connecting the peripheral computing device with the computing device.

In another implementation, a device interface component of a peripheral computing device is disclosed. The device interface component may include an electrical connection protrusion configured to insert in a corresponding electrical receptacle of a computing device. The device interface component may also include a magnetically connectable docking member configured to magnetically attract or to be magnetically attracted to a corresponding docking component on the computing device. The device interface component may include a support rail configured to support the electrical connection protrusion and the magnetically connectable docking member, the support rail comprising a shoulder configured as a guide for connecting the peripheral computing device with the computing device.

In another implementation, a computing device is disclosed. The computing device may include a mobile computing device portion comprising an electrical receptacle connected to electrical circuitry, a first magnetically connectable docking member mounted within the mobile computing device portion, and a mechanical receptacle mounted within the mobile computing device portion. The computing device may also include a peripheral computing device portion removably attached to the mobile computing device portion via a device interface component. The device interface component may include an electrical connection protrusion extending from the device interface component and configured to insert into the electrical receptacle. The device interface component may also include a second magnetically connectable docking member configured to magnetically attract or to be magnetically attracted to the first magnetically connectable docking member. The device interface component may also include a support rail configured to support the electrical connection protrusion and the second magnetically connectable docking member, the support rail comprising a shoulder extending from a same surface of the device interface component as the electrical connection protrusion and configured to define a pivot point to guide connecting the peripheral computing device portion with the mobile computing device portion.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

Figure 1:
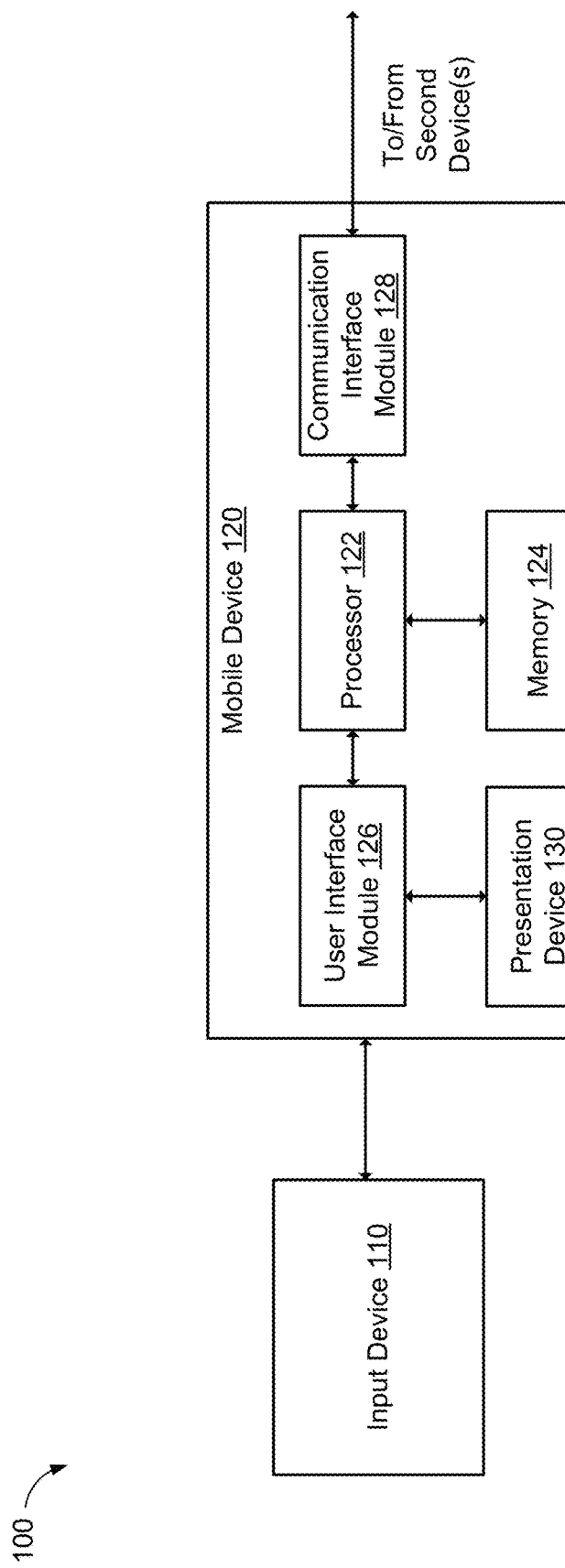
FIG. 1 is a block diagram of an example environment for a computing device, according to aspects of the present disclosure.

Known mobile computing devices, such as tablets, smartphones, and/or phablets, include a display or touchscreen that displays or presents content (e.g., images, alphanumeric characters). Mobile computing devices are increasingly used for a variety of purposes including word processing or electronic mail ("e-mail"). To prompt input (e.g., typing), at least some known mobile computing devices display a virtual keyboard on the touch screen. Typing on the touchscreen, however, may be awkward, tedious, or time consuming for a user. In some cases, to improve typability, at least some mobile computing devices include the display or touchscreen coupled with a physical keyboard. In other cases, a second touchscreen or computing input device may be coupled to the display or touchscreen of the mobile computing device. These coupled keyboards and second touchscreens, or peripheral computing devices in the form of input devices, can communicate with the mobile computing device by wired and/or wireless connections. At least some known wired connections, however, are exposed to the environment and, thus, may be susceptible to additional wear and tear and/or be aesthetically unpleasant. To address Some of these issues, mobile devices may use a wireless connection with a keyboard. However, at least some known wireless systems used to couple a mobile device to a keyboard are costly and/or require a separate power source and/or may experience connectivity issues (e.g., when other interfering electromagnetic signals are present). A detachable keyboard (or second touchscreen/computing input device) provides a wired system for physically and electrically connecting to a mobile computing device, and may cost less than wireless systems and solve some of the connectivity issues. However, some detachable keyboards (or second touchscreen/computing input device) may be prone to disconnection from the mobile computing device based on an arrangement of the keyboard and the mobile (computing) device. For example, some mobile computing devices and detachable keyboards may have a full range of motion that allows these devices to transition from a closed position (i.e., keyboard contacts front side or surface of the mobile computing device), to a kickstand position (i.e., keyboard is at an obtuse angle with the mobile computing device), to a table position (i.e., keyboard contacts a back side of the mobile computing device), and any position in between. When in some positions or transitioning between positions, contact between the keyboard and mobile computing device may be strained causing, in some cases, electrical connections to be disconnected.

Examples of the present disclosure include connection mechanisms for a peripheral computing device, such as but not limited to a user input device in the form of a keyboard, to connect with a mobile computing device. Aspects of the present disclosure enable the peripheral computing device (e.g., physical keyboard) to be used in a configuration that provides a user with a user-friendly manner to provide input (e.g., via typing) to the mobile computing device. For example, the connection mechanisms of the present disclosure may allow the peripheral computing device (e.g., keyboard) to maintain electrical connection with the mobile computing device when in the positions described above or in any other relative position, and/or during transition between these positions.

Turning now to the figures, examples of a peripheral computing device (e.g., a user input device such as a keyboard) configured to couple with a mobile computing device are described herein. It is to be understood that aspects of the figures may not be drawn to scale and are instead drawn for illustrative purposes.

Referring to FIG. 1, an example computing environment 100 includes a peripheral computing device, such as but not limited to a user input device 110, that is detachable from a mobile computing device 120. The user input device 110 may include, without limitation, a keyboard, a mouse, a controller, a touchscreen, and/or a remote control. In some examples, the mobile computing device 120 may be or include a tablet, a smartphone, a mobile telephone, a phablet, a laptop, a portable media player, a netbook, a computing pad, a desktop computer, a game console, or any other type of computing device. While some examples of the disclosure are illustrated and described herein with reference to the mobile computing device 120, aspects of the disclosure are operable with any computing or electronic device, including a peripheral computing device such as detachable user input device, that executes instructions to implement the operations and functionality associated with the computing device.

In an aspect, the mobile computing device 120 may include a processor 122 configured to execute one or more computer-executable instructions for implementing operations and functionality associated with the mobile computing device 120. The processor 122 may include any quantity of processing units, and the instructions may be performed by the processor 122 or by multiple processors within the mobile computing device 120 or performed by a processor external to the mobile computing device 120. In some examples, the processor 122 is transformed into a special purpose microprocessor by executing computer-executable instructions or by otherwise being programmed.

In an aspect, the mobile computing device 120 also includes memory 124 or computer-readable media, storing computer-executable instructions, user data, and/or any other data, for execution by the processor 122. The memory 124 may include any quantity of media associated with or accessible by the mobile computing device 120. The memory 124 may be internal to the mobile computing device 120 (as shown in FIG. 1), external to the mobile computing device 120 (not shown), or both (not shown).

In some examples, the memory 124 stores, among other data, one or more applications. The applications, when executed by the processor 122, operate to perform functionality on the mobile computing device 120. Example applications may include a mail application program, a web browser, a calendar application program, an address book application program, a messaging program, a media program, a location-based service program, a search program, and the like. The applications may communicate with counterpart applications or services, such as web services accessible via a network (not shown). For example, the applications may represent downloaded client-side applications that correspond to server-side services executing in the cloud. Although the memory 124 is shown separate from the processor 122, examples of the disclosure are not limited to this arrangement and may include other configurations of the memory 124 and the processor 122 including the memory 124 being onboard the processor 122 such as in some embedded systems.

In some examples, the mobile computing device 120 may also include one or more user interface modules 126 for exchanging data between the mobile computing device 120 and a user. For example, the user interface module 126 may include or may be coupled with a presentation device 130 configured to present information, such as text, images, audio, video, graphics, alerts, and the like, to the user. The presentation device 130 may include, without limitation, a monitor, a display, a touchscreen, a speaker, a printer, and/or a haptic feedback device (such as a vibrating component).

In an aspect, the user interface module 126 may be coupled with the user input device 110, which is configured to receive input from the user. For example, the user interface module 126 may include, without limitation, a controller that manages receiving user inputs and/or presenting outputs to the user, a capacitive touch screen display, and/or a haptic feedback device (such as a vibrating component). In at least some examples, the presentation device 130 and the user input device 110 may be integrated in or detachably connected to form a common user interface device, controlled by the user interface module 126, and configured to present information to the user and receive information from the user.

In an aspect, the mobile computing device 120 may also include one or more communication interface modules 128 for exchanging data between the mobile device 122 and a second device (not shown) such as computer-readable media and/or another computing device. Communications between the mobile computing device 120 and the second device may occur using any protocol or mechanism over any wired or wireless connection. For example, the mobile computing device 120 may communicate with the second device using one or more technologies including BLUETOOTH®, WI-FI, or a cellular network technology standard (e.g., LTE).

The block diagram of FIG. 1 is merely illustrative of an example environment that may be used in connection with one or more examples of the disclosure and is not intended to be limiting in any way. Further, other peripheral devices or components of the computing devices known in the art are not shown, but are operable with aspects of the disclosure. At least a portion of the functionality of the various elements in FIG. 1 may be performed by other elements in FIG. 1, or an entity (e.g., processor, web service, server, applications, computing device, etc.) not shown in FIG. 1.

Referring to FIGS. 2, 3A, 3B, and 4, an example peripheral computing device in the form of a detachable keyboard 200, which is a non-limiting example of the user input device 110, is removably coupleable to the mobile computing device 120 (see FIGS. 3A and 3B) according to aspects of the present disclosure. As shown in detail by FIG. 2, the keyboard 200 may include a user interface component 210 configured to receive input from the user. In one implementation, the user interface component 210 may include a plurality of keys 212 and/or a touchpad 214 for inputting data. In an example, the plurality of keys 212 may be arranged in any keyboard layout (e.g., QWERTY layout), and the touchpad 214 may be positioned below the plurality of keys 212. However, the present disclosure is not limited to any arrangement of the plurality of keys 212 or the touchpad 214. For example, the detachable keyboard 200 may include a touchscreen device having virtual keys.

The keyboard 200 may also include a device interface component 220 configured to interface with the mobile computing device 120. The device interface component 220 may include an interface body 222 configured to interface with and/or receive the mobile computing device 120. In an example, the interface body 222 may be configured to provide electrical connection with the mobile computing device 120 along with functionality for the keyboard 200 to stay connected with the mobile computing device 120, as described in further details herein. The interface body 222 may be aligned substantially parallel with a side of the user interface component 210.

The device interface component 220 may also include a spine 224 that flexibly connects the interface body 222 and the user interface component 210. The spine 224 may be configured to contain and/or route wires between the interface body 222 and the user interface component 210. Further, the flexible connection provided by the spine 224 enables the keyboard 200 to be used as a cover to the mobile computing device 120 and/or for supporting the mobile computing device 120 in different viewing arrangements.

Figure 2:
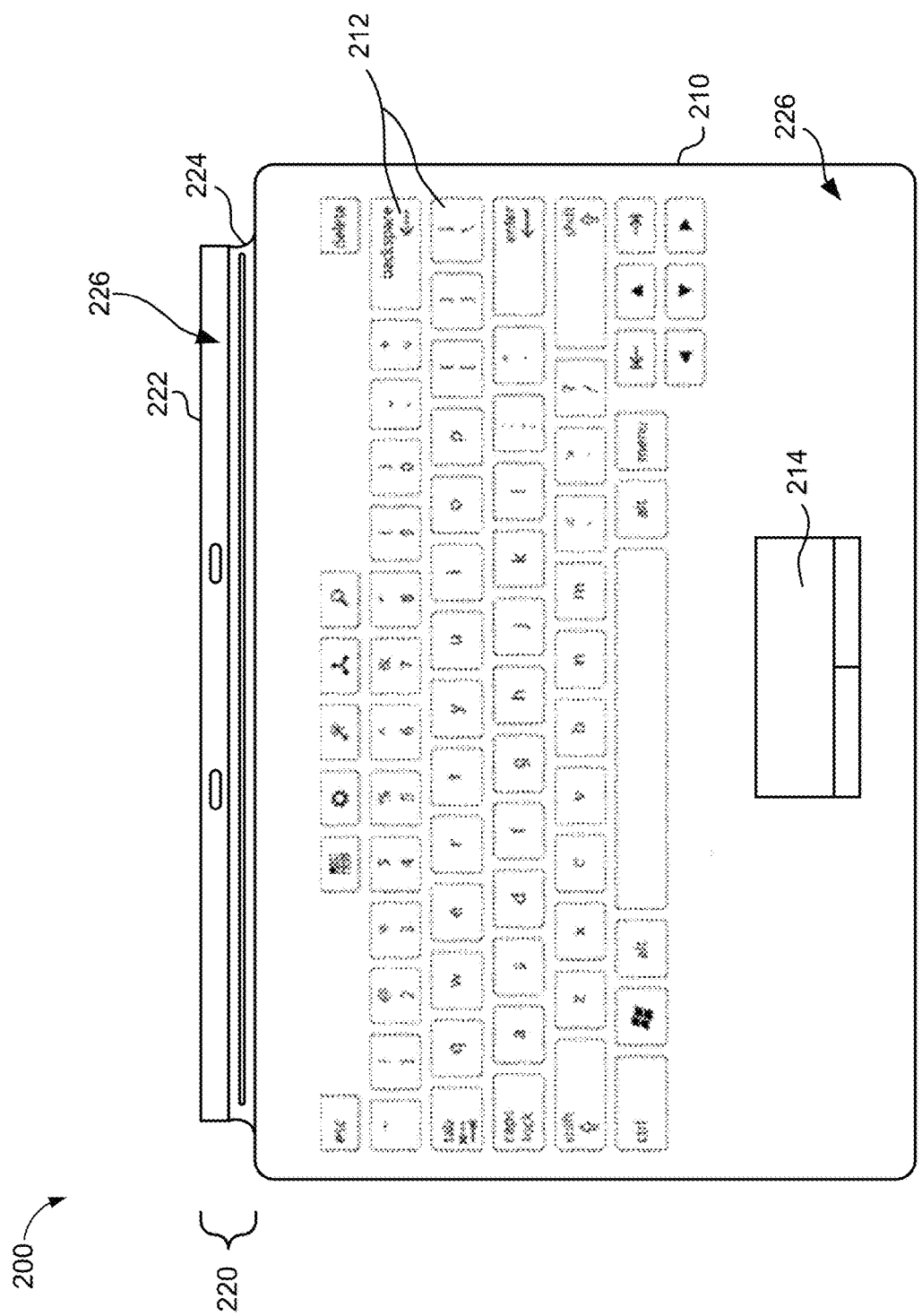
FIG. 2 is a top-down plan view of an example peripheral computing device, such as a detachable user input device in the form of a keyboard, according to aspects of the present disclosure.
Figure 3B:
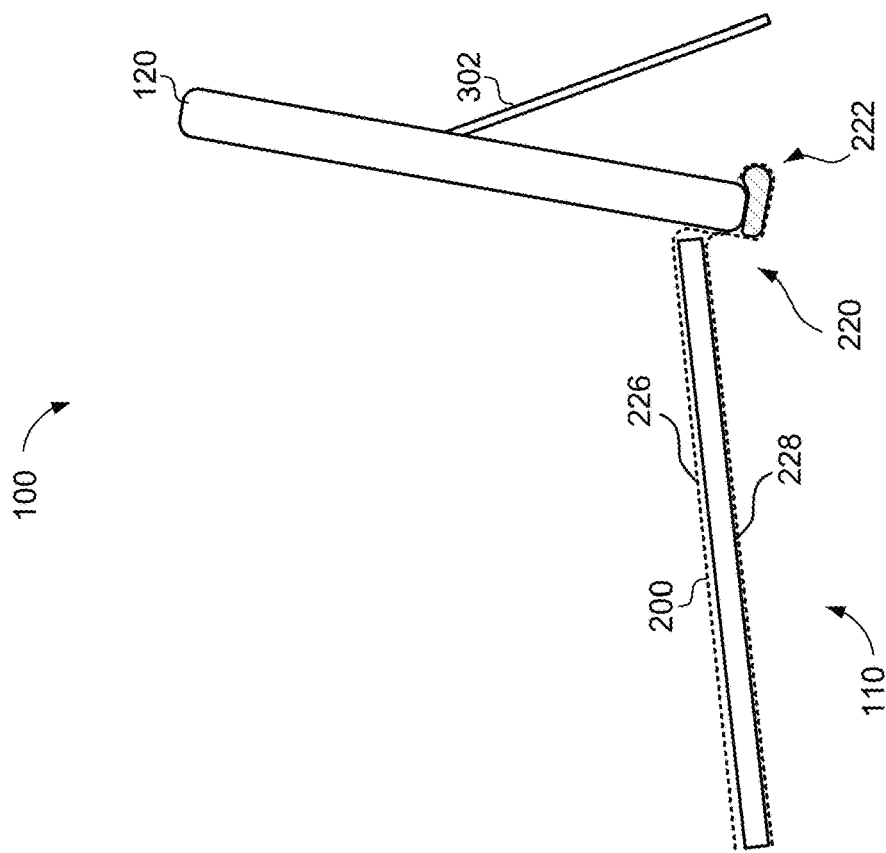
FIGS. 3A and 3B respectively are a front view and a side view of the detachable keyboard of FIG. 2 attached to an example mobile computing device, with the computing device maintained in an upright position by an example kickstand, according to aspects of the present disclosure.
Figure 3A:
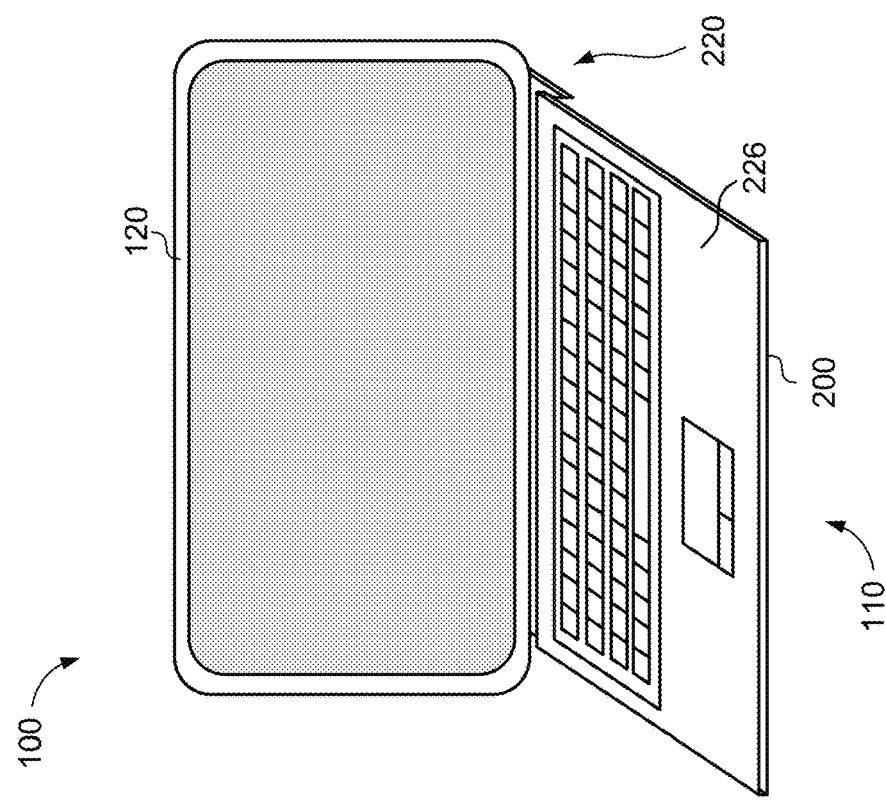

Referring specifically to FIGS. 2, 3A, and 3B, the keyboard 200 may include electrical and mechanical elements that define and/or enable operation of the user interface component 210, which may be contained with top material layer 226 and bottom material layer 228. Each of the top material layer 226 and the bottom material layer 228 may include a single material layer, or multiple material layers include different materials. For instance, in some implementations, the top material layer 226 and the bottom material layer 228 may be formed from plastics, while in other implementations they may include a plastic layer covered by a fabric layer to provide a more pleasant feel to improve the user experience. In other examples, the top material layer 226 and the bottom material layer 228 may be formed from a metal (or metals) such as aluminum, or any combination of plastics and metals.

Figure 4:
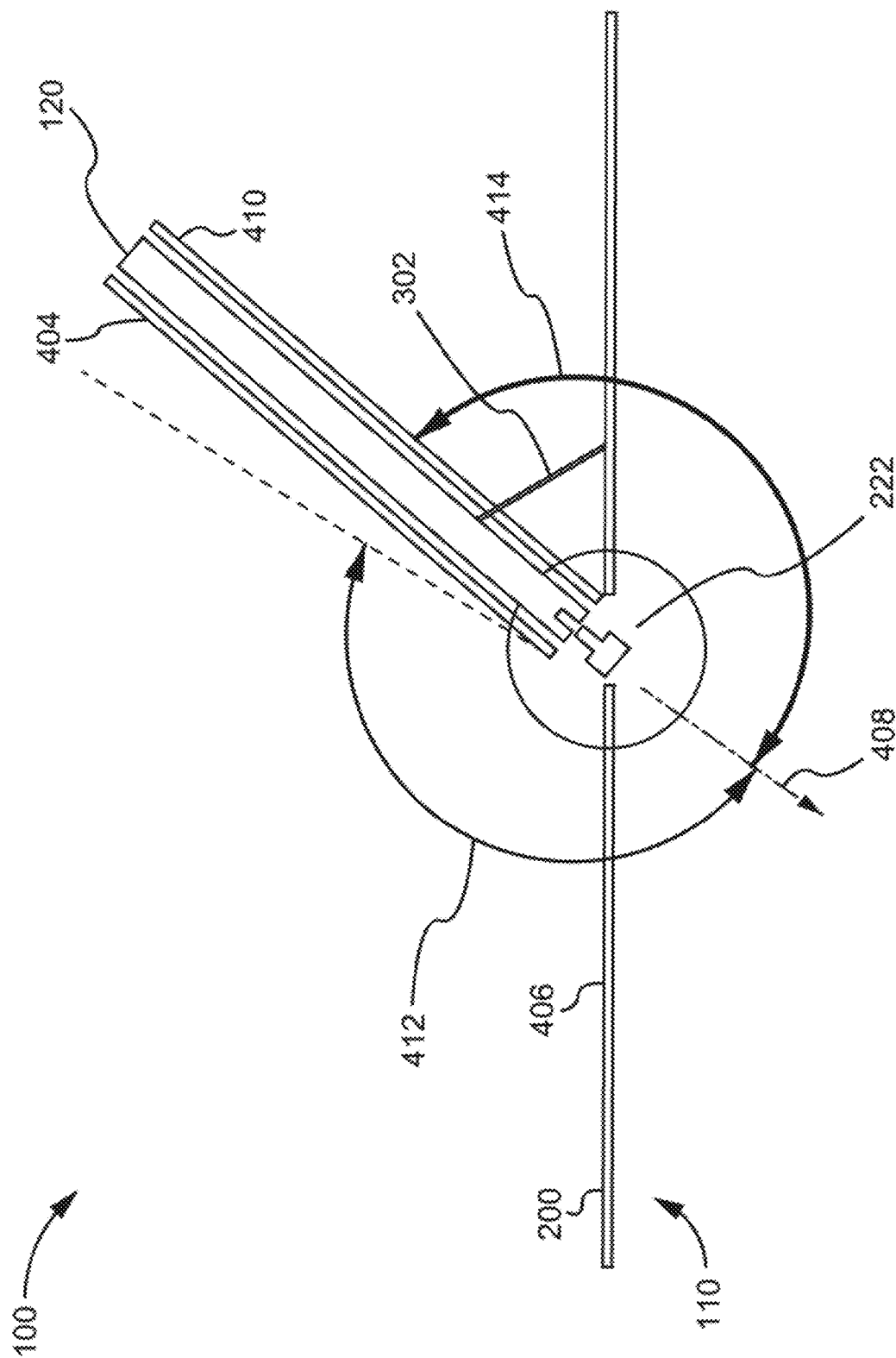
FIG. 4 is a side view, similar to FIG. 3B, including various relative positions of the detachable keyboard and the mobile computing device, according to aspects of the present disclosure.

Referring specifically to FIGS. 3B and 4, the mobile computing device 120 may be supported by a moveable kickstand 302 at one of more of a plurality of positions or angles. For example, specifically referring to FIG. 4, such positions or angles may include the closed position 404 (e.g., the top surface of the keyboard 204 contacting or adjacent to the top surface of the mobile computing device 120), the kickstand position 406 or 408 or anywhere within region 412, and the table position 410 or anywhere within region 414, similar to the positions discussed above. In one implementation, for example, the kickstand 302 may be an arm rotatably connected at one end to a portion of the back side of the body of the mobile computing device 120 such that the arm may be moved from being substantially parallel to the back side to being angled relative to the back side. The angular positioning of the kickstand 302 relative to the back side of the mobile computing device 120 enables the mobile computing device 120 to be used by a user in a flat position or in a standing position at one or more different angles relative to a surface on which the mobile computing device 120 and the kickstand 302 are supported.

Further, in some implementations, the relative position of the keyboard 200 and the mobile computing device 120 may define active and inactive states of the keyboard 200 and/or mobile computing device 120. For example, in one implementation (see FIG. 4), region 412 may define an active state of both the keyboard 200 and the mobile computing device 120, while region 414 may define an inactive state of the keyboard 200 and the mobile computing device 120 may still be in an active state or it may be in an inactive state.

Additionally, as noted herein, the special configuration of the device interface component 220, and its subcomponents, enable an improved connection between the detachable keyboard 200 to the mobile computing device 120 to be maintained when the mobile computing device 120 is being used in each of the different possible relative positions between the keyboard 200 and the mobile computing device 120. When the detachable keyboard 200 and the mobile computing device 120 are in use, they may experience dynamic forces, such as from a user pressing on the keyboard 200 and/or such as from moving from one position to another position. Such dynamic forces may act on the device interface component 220 to oppose electrical and/or mechanical connection with the mobile computing device 120. The present solution provides a connection mechanism that reduces or otherwise opposes these types of dynamic disconnection forces.

Figure 5:
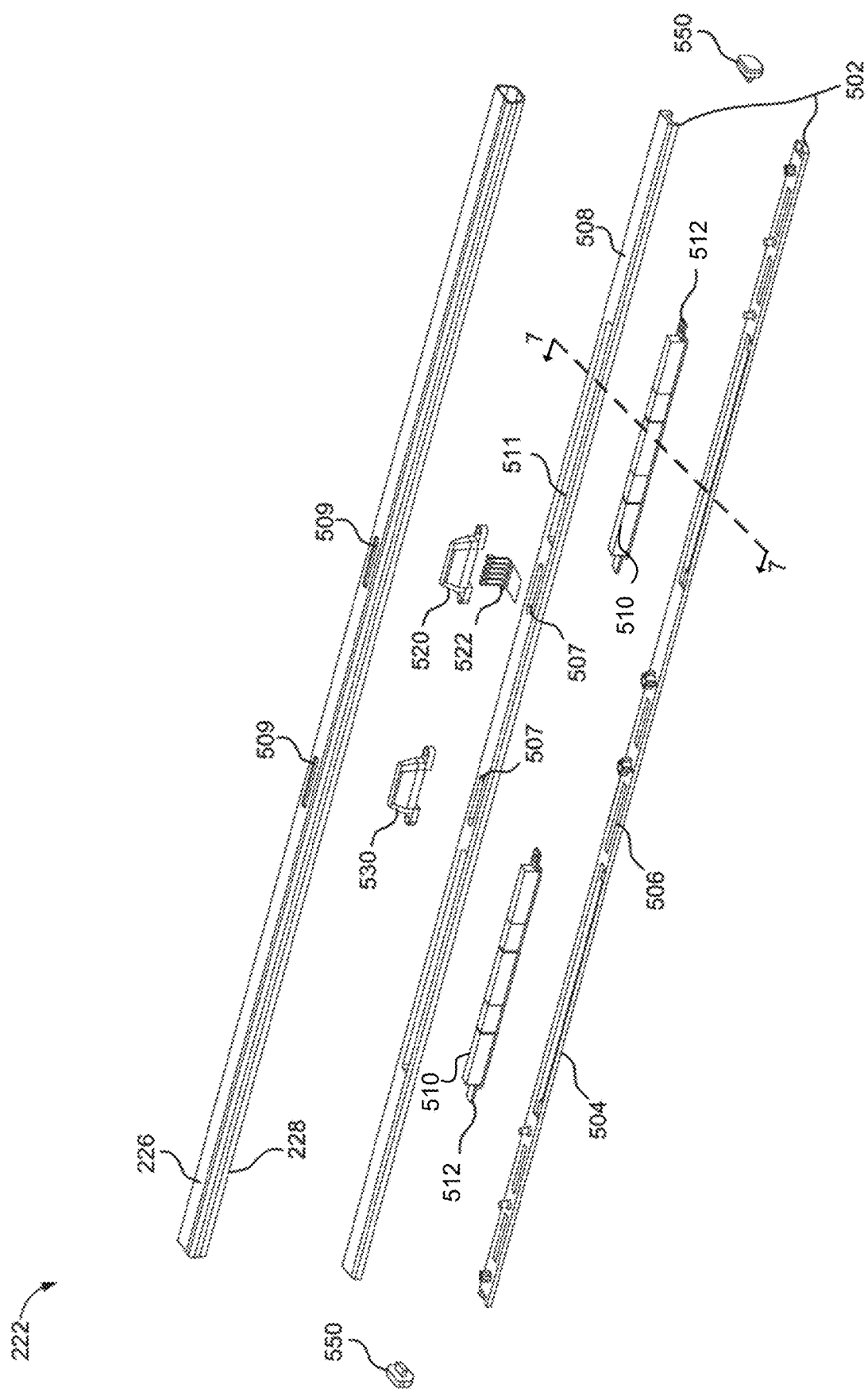
FIG. 5 is an exploded view of an example of an interface body, according to aspects of the present disclosure.
Figure 6:
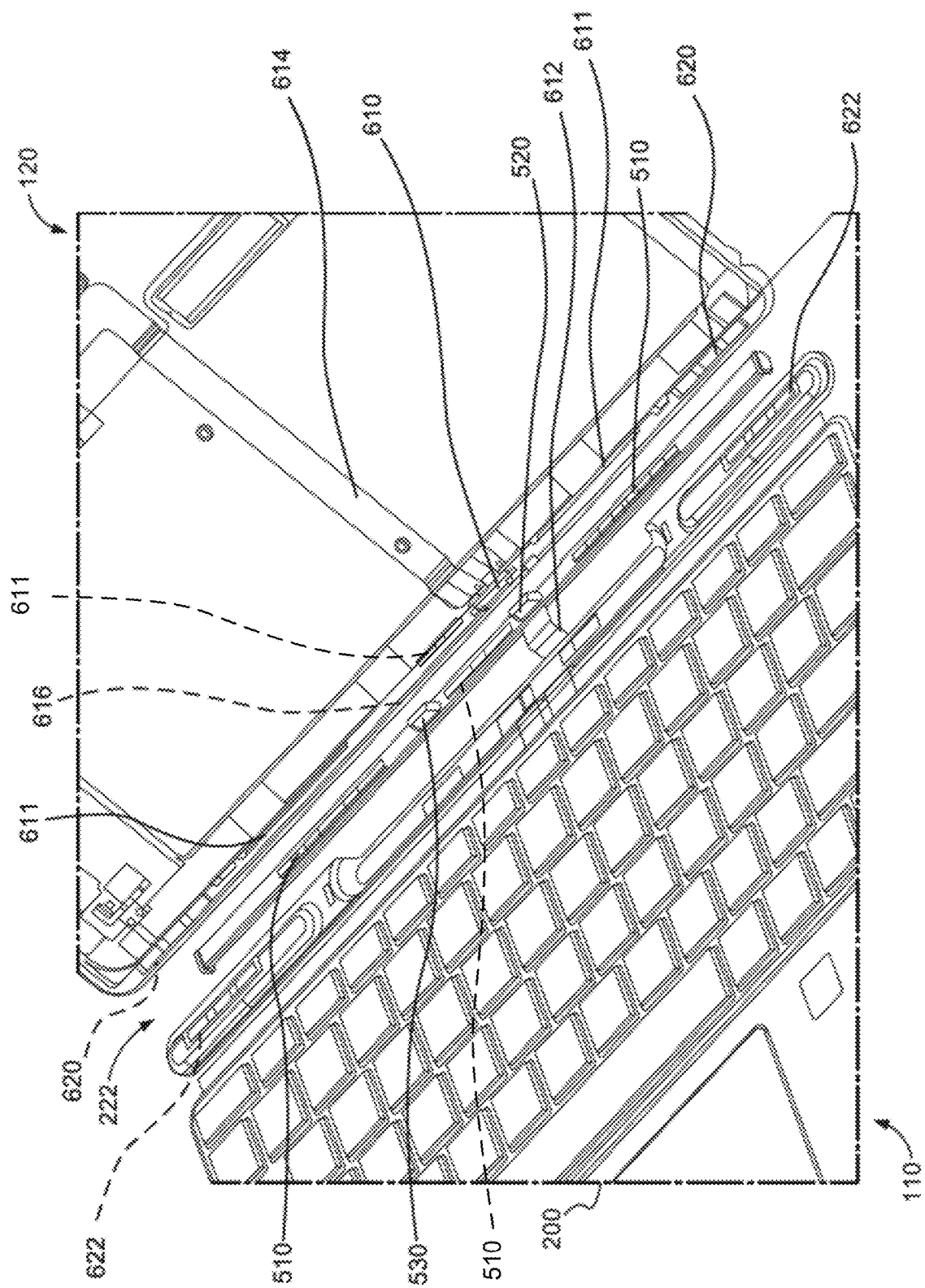
FIG. 6 is a partial top perspective view of an example of the interface body of FIG. 5 in a position to connect an example detachable keyboard and mobile computing device, which top surface components of the mobile computing device removed to expose the corresponding connection mechanisms, according to aspects of the present disclosure.

Referring to FIGS. 5 and 6, for instance, an example of the interface body 222 includes a variety of components that enable improved electrical and mechanical attachment of the detachable keyboard 200 to the mobile computing device 120. The interface body 222 may include a support rail 502 configured to provide support and attachment of one or more components of the interface body 222. The support rail 502 may include a backing rail 504 configured to provide support and attachment to one or more magnetically connectable docking members, such as docking magnets 510 (e.g., two docking magnets as shown by FIG. 5 or three docking magnets as shown by FIG. 6). In an example, the backing rail 504 may include one or more connecting mechanisms 512 (e.g., a plate having threaded holes, clips, indentations) to connect the docking magnets 510 to the backing rail 504. Further, the backing rail 504 may include one or more apertures 506 to provide wiring runs between the interface body 222 and the user interface component 210.

Referring to FIGS. 5, 6, and 7A-7E, the support rail 502 may also include a body frame 508 configured to support one or more protrusions including one or more of an electrical connection protrusion 520 and a mechanical connection protrusion 530. The body frame 508 may be shaped with a flat top surface, as shown by FIG. 5 and by example configuration 700 of FIG. 7A, and a concave bottom surface to receive the docking magnets 510. Alternatively, the body frame 508 may have one or more shoulders 730 and a concave bottom surface, as shown by configuration 720 of FIG. 7B. The one or more shoulders 730 may provide a guide and/or pivot point for the mobile computing device 120 to couple with the keyboard 200. The body frame 508 may also include one or more apertures 511 for receiving the docking magnets 510 and/or one or more apertures 507, e.g., aligned with apertures 506, for receiving protrusions (e.g., electrical connection protrusion 520 or mechanical connection protrusion 530) and/or for providing wiring runs between the interface body 222 and the user interface component 210.

The docking magnets 510 are configured to magnetically attract one or more corresponding docking magnets 611 (see FIG. 6) on the mobile computing device 120. In an example, each of the docking magnets 510 may include a set of magnets or a gang of magnets (e.g., 5 or 7) to form flux fountain arrays having alternating polarized portions along the docking magnets 510. Further, referring to configuration 740 of FIG. 7C, in an implementation, one or more of the docking magnets 510, or an north-south pole axis of one or more of the docking magnets 510, may be angularly positioned at a degree 741 off of vertical axis 742 to provide a pulling direction for the docking magnets 510 to pull together the mobile computing device 120 and the interface body 222 and guide connection to the keyboard 200. In other words, the angular magnetism of the degree 741 off of vertical axis 742 may increase a strength of the magnetic force between the two mating magnets (i.e., docking magnets 510 of detachable keyboard 200 and docking magnets 611 of mobile computing device 120). In this example, the vertical axis 742 may be an axis perpendicular to surface of backing rail 504, and the angular position 741 may be in the range of 10 to 30 degrees, or 15 to 25 degrees, or any degree suitable to effect the attraction and guiding functionality discussed herein.

Figure 7A:
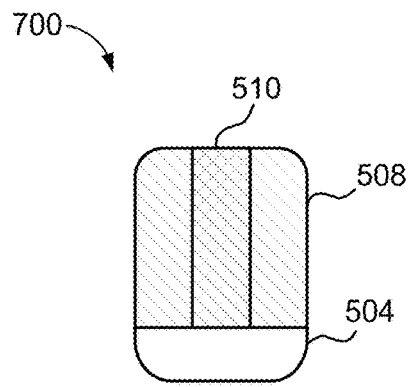
FIGS. 7A, 7B, 7C, 7D, and 7E are cross sectional views of a plurality of examples of an interface body taken along line 7-7 of FIG. 5, according to aspects of the present disclosure.
Figure 7B:
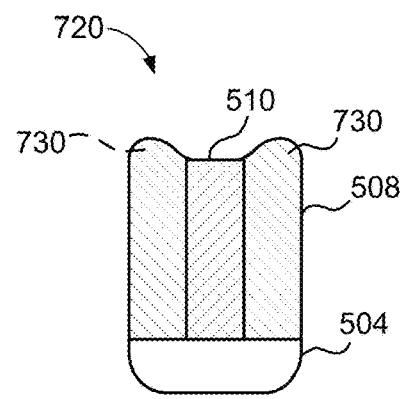
Figure 7C:
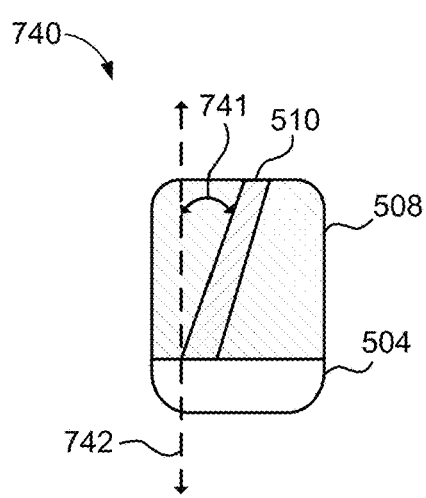
Figure 7D:
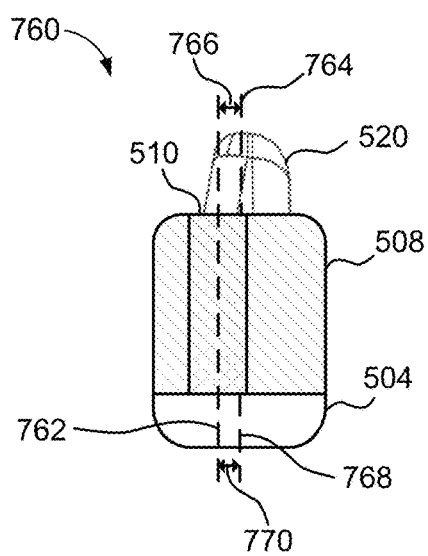

Referring to configuration 760 of FIG. 7D, in an implementation, one or more of the docking magnets 510 may be offset from a centerline of one or more of the electrical connection protrusion 520 or the backing rail 504. As shown, a centerline 762 of one or more of the docking magnets 510 may be offset from a centerline 764 of the electrical connection protrusion by an offset 7626 and/or a centerline 768 of the backing rail 504 by an offset 770. In an example, the offset 766 and the offset 770 may be the same or a different value. In an example, the offset 766 and/or the offset 770 of the one or more docking magnets 510 may create a rotational motion which may help the electrical connection protrusion 520 and/or the mechanical connection protrusion 530 to engage with corresponding receptacles of the mobile computing device 120 and to overcome a stubbing effect of a tall rectangular structure (i.e., electrical connection protrusion 520 and/or mechanical connection protrusion 530) into a thin slot (i.e., electrical receptacle 610 and/or receptacle 616) at a range of angles other than a perfect parallel alignment. Further, the offset 766 and/or the offset 770 may also reduce a magnetism on an outer edge of the spine 224 which may prevent a side attract to the mobile computing device 120 causing a misalignment of the electrical connection protrusion 520 and/or the mechanical connection protrusion 530 when engaging with the electrical receptacle 610 and/or the receptacle 616.

Figure 7E:
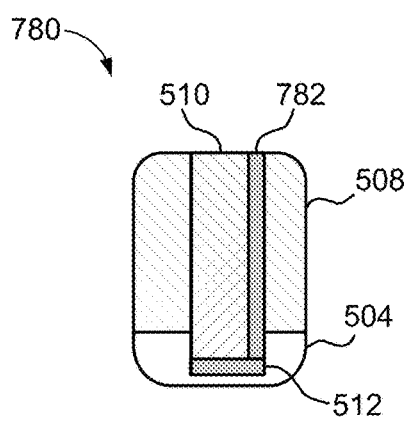

Referring to configuration 780 of FIG. 7E, in an implementation, one or more of the docking magnets 510 may use magnetic shielding 782 and/or the connection mechanism 512 to achieve a desired magnetic flux field. For example, as shown, the magnetic shielding 782 may be provided on a side of the docking magnets 510 to reduce a magnetism on an outer edge of the spine 224 which may prevent a side attract to the mobile computing device 120. In another example, the connection mechanism 512 may be provided on another side of the docking magnets 510 to reduce a magnetism on a lower edge of the spine 220. In both examples, stray magnetic fields may be blocked from causing side attraction between the spine 224 and the mobile computing device 120 (and/or another object). In an example, the magnetic shielding 782 or the connection mechanism 512 may be formed of a magnetic shield material such as a stainless steel SUS430 or one or more ferromagnetic materials Further, while the configurations of FIGS. 7A-7E are shown as individual implementations of the docking magnets 510, implementations of the present application are not limited to these implementations. Instead, one or more implementations of FIGS. 7A-7E may be combined and used by the detachable keyboard 200. For example, the offset 766 and/or the offset 770 may be used in combination with the angular magnetism of the degree 741 off of vertical axis 742. The combination of the offset and the angular magnetism may bring the centers of the backing rail 504 and the mobile computing device 120 closer together at an increased magnetic force as compared to these mechanisms being used individually.

Optionally, the mobile computing device 120 may include one or more additional magnetically connectable docking members, such as side magnets 620, on the ends of the mobile computing device 120 that are configured to attract a corresponding one or more additional magnetically connectable docking members, such as side magnets 622, on the ends of the interface body 222 of the keyboard 200. In particular, the side magnets 620 of the mobile computing device 120 and the side magnets 622 of the keyboard 200 may secure ends of the mobile computing device 120 and the keyboard 200 from separating and/or may maintain the mobile computing device 120 and the keyboard 200 in a position such as the closed position 404 or kickstand position 406 or 408.

Referring to FIGS. 5, 6, and 8A-8D, as mentioned above, the interface body 222 may also include the electrical connection protrusion 520 that is configured to insert in a corresponding electrical receptacle 610 (see FIG. 6) of the mobile computing device 120. The electrical connection protrusion 520 provides electrical connection with one or more electrical circuits of the mobile computing device 120 via one or more electrical contacts 522 (see FIGS. 5, 8A, 8C, and 8D). In an example, the electrical contacts 522 may connect to one or more wires such as ribbon cable 612 (see FIG. 6) which provide electrical communication between the electrical connection protrusion 520 and one or more components of the keyboard 200.

In an example, the electrical contacts 522 may be located on a contact side 820 (see FIGS. 8A, 8C, and 8D) of the electrical connection protrusion 520. The electrical contacts 522 may be elongated to provide a "swipe length" to facilitate maintaining electrical connection retention when the keyboard 200 is in certain positions or transitioning to different positions or gets partially displaced from being fully seated with the mobile computing device 120. In an example, the electrical contacts 522 may have a swipe length 830 between 0.70 millimeters (mm) and 0.90 mm. Further, the electrical contacts 522 may be located within a recessed portion 822 of the contact side 820 to prevent shorting (e.g., on a body or side wall of the mobile computing device 120) during insertion of the electrical connection protrusion 520 in the corresponding receptacle 610 of the mobile computing device 120. The electrical connection protrusion 520 may also include a beveled portion 830 to facilitate insertion of the electrical connection protrusion 520 into the corresponding electrical receptacle 610, which may include a corresponding beveled portion 815. The beveled portion 830 of the electrical connection protrusion 520 may be beveled all around, or at least on top, bottom, and side surfaces, to form a ramp-like structure having a narrower distal end as compared to a proximal end of the extending portion of the protrusion. As such, the beveled portion 830 of the electrical connection protrusion 520 and the corresponding beveled portion 815 of the electrical receptacle 610 allows for initial misalignment during the insertion process, but serves to guide the electrical connection protrusion 520 into alignment with the electrical receptacle 610 upon further insertion. In some cases, the mobile computing device 120 may also include a beveled portion 825 encircling the opening in the wall to which the electrical receptacle 610 is mounted to further ease the insertion of the electrical connection protrusion 520 into the electrical receptacle 610.

The electrical receptacle 610 may include an electrical connection for connecting to one or more wires such as ribbon cable 614 (see FIG. 6) which provide electrical communication between the electrical receptacle 610 and one or more components of the mobile computing device 120. The electrical receptacle 610 may include one or more contact springs 840 (see FIG. 8B) provided to contact the corresponding electrical contacts 522 of the electrical connection protrusion 520. The contact springs 840 may be located within the electrical receptacle 610 such that a point of contact 832 of the contact springs 840 and the electrical contacts 522 provides the swipe length 830 during insertion or partial displacement between the electrical connection protrusion 520 and the electrical receptacle 610, such as from use of the keyboard 200 and/or transition between positions.

Figure 9A:
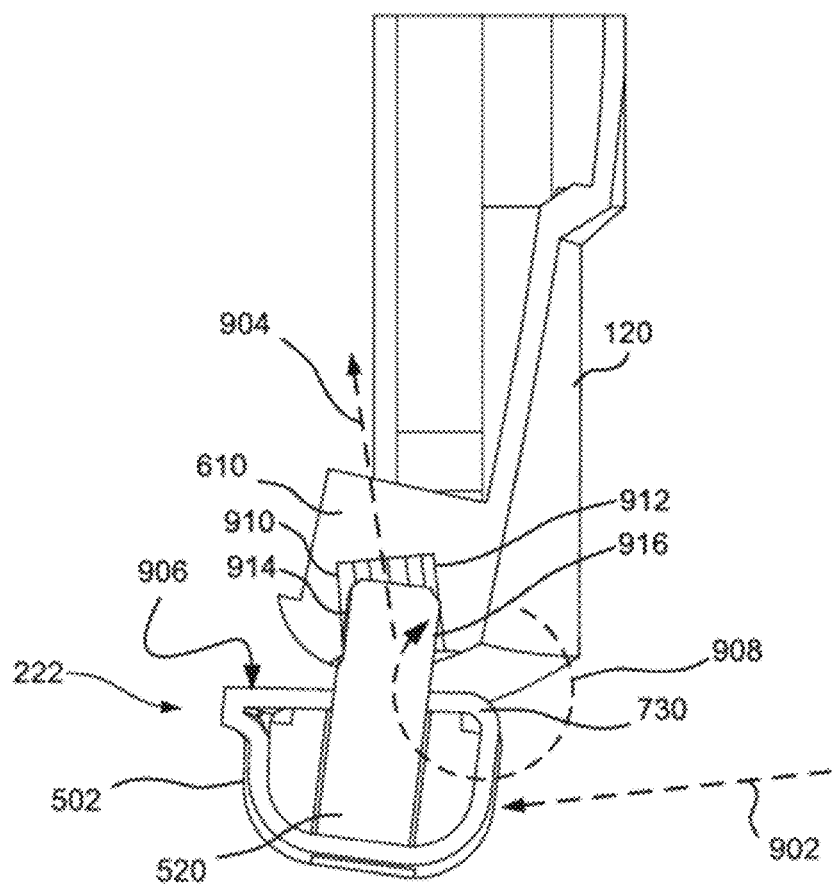
FIGS. 9A and 9B are cross-sectional views of examples of connection protrusions coupled with receptacles and subject to a disconnection force, according to aspects of the present disclosure.
Figure 9B:
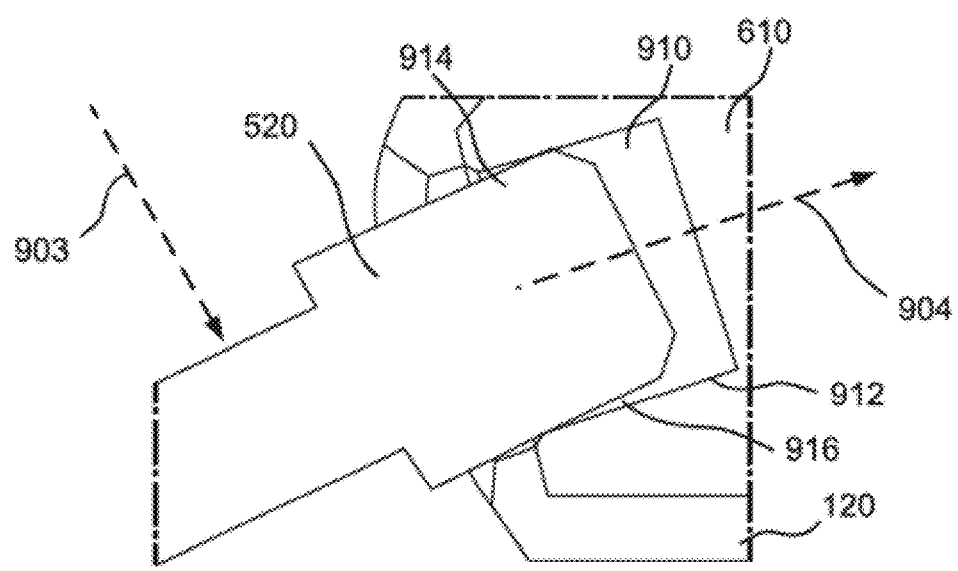

Referring to FIGS. 9A and 9B, the detachable keyboard 200 and the mobile computing device 120, when coupled, may experience one or more dynamic forces 902, 903. These dynamic forces 902, 903 may result from a user pressing on the keyboard 200 and/or from moving the keyboard 200 from one position to another position. The dynamic forces 902, 903 may be in a direction opposite of or at an angle relative to a direction of insertion 904 of the electrical connection protrusion 520 into the electrical receptacle 610, thereby biasing the electrical connection protrusion 520 to move toward a disconnected state with the electrical receptacle 610. In other words, the dynamic forces 902, 903 may at least partially separate the electrical connection protrusion 520 from being fully seated within the electrical receptacle 610, thereby potentially interrupting the functionality of the combined mobile computing device 120 and the keyboard 200 in prior solutions that lack the current design.

The present solution may avoid or resist his disconnection state, however, due to the particular design configuration of one or more components of the interface body 222 as well as the interfacing portions of the bodies of the electrical connection protrusion 520 and the electrical receptacle 610. For example, the shoulder 730 located on the rear portion of the interfacing surface 906 of the interface body 222 extends in a similar direction as the electrical connection protrusion 520 (and the mechanical connection protrusion 530) and defines a pivot point that provides a rotationally bias 908 that guides the electrical connection protrusion 520 into the electrical receptacle 610 during insertion as well as providing resistance to any opposing torsional forces (for instance, a dynamic force in the opposite direction as dynamic force 902 in FIG. 9A), which may otherwise displace the electrical connection protrusion 520 into the disconnected state. Moreover, the opposing top walls 910, 914 and bottom walls 912, 916 and/or the opposing side walls (not shown) of the electrical connection protrusion 520, may have a interfacing length (in the connected state) and relative spacing to oppose these types of dynamic disconnection forces 902, 903.

Figure 8A:
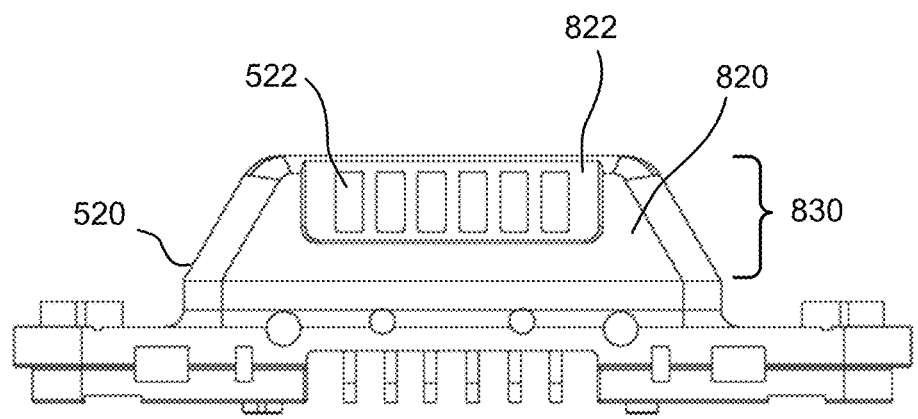
FIGS. 8A and 8B are top-down view (with the contact surface on the top side) and a side view, respectively, of an example of a connection protrusion, according to aspects of the present disclosure.
Figure 8B:
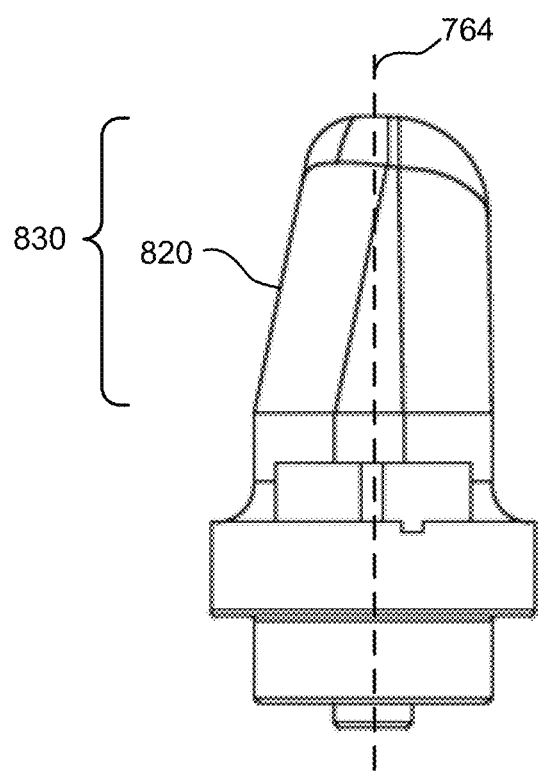
Figure 8C:
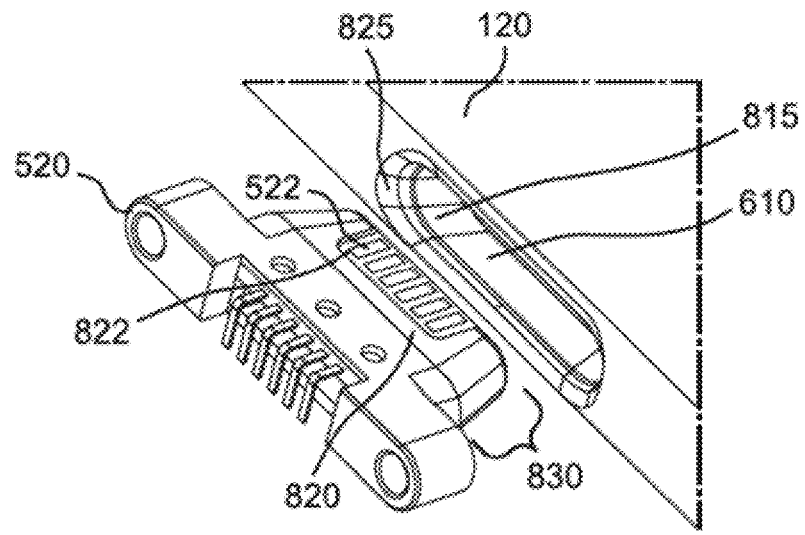
FIGS. 8C and 8D are contact surface perspective view and a cross sectional view (with the contact surface on the bottom side), respectively, of an example of a connection protrusion and receptacle, according to aspects of the present disclosure.
Figure 8D:
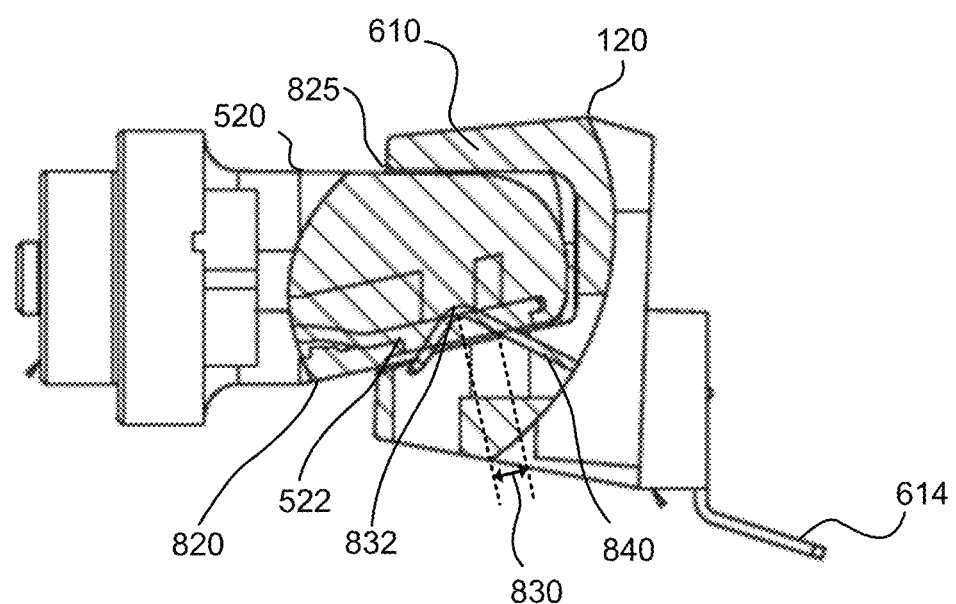

Additionally, as mentioned with regard to FIG. 8B, the swipe length 830 is designed to have a value that accommodates a certain amount of displacement between the electrical connection protrusion 520 and the electrical receptacle 610, for example caused by such dynamic forces 902, 903, while still maintaining the connected state and avoiding interrupting the functionality of the device.

Figure 10:
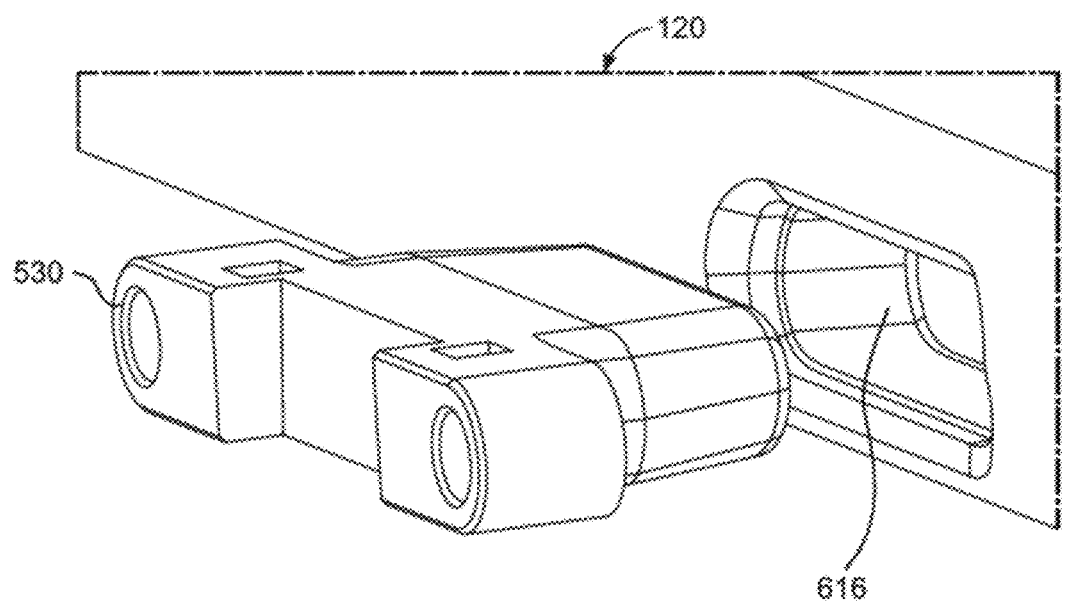
FIG. 10 is a perspective view of an example of a mechanical protrusion in a position to be coupled with a receptacle mounted within a side wall portion of the computing device, according to aspects of the present disclosure.

Referring to FIGS. 6 and 10, the interface body 222 may also include the mechanical connection protrusion 530 configured to insert in a corresponding receptacle 616 of the mobile computing device 120. In an example, the mechanical connection protrusion 530 and the corresponding receptacle 616 may be shaped similar to the electrical connection protrusion 520 and the corresponding electrical receptacle 610 (see, e.g., FIGS. 8A, 8B, 9A and 9B), however, the mechanical connection protrusion 530 and receptacle 616 does not provide electrical connection with the mobile computing device 120 and thus the electrical contacts may be omitted.

Referring back to FIGS. 2, 3A, 3B, and 5, as mentioned above, the top material layer 226 and bottom material layer 228 of the interface body 222 may define a wrap configured to cover at least a portion of the support rail 502, the docking magnets 510, the electrical connection protrusion 520, and the mechanical connection protrusion 530. Further, the top material layer 226 and bottom material layer 228 may include one or more apertures 509 (see FIG. 5) for the electrical connection protrusion 520 and/or the mechanical connection protrusion 530. The top material layer 226 and bottom material layer 228 may be include one or more layers of fabric and polyurethane. Also, referring specifically FIG. 5, the interface body 222 may further include one or more caps 550 located at the ends of the support rail 502. The caps 550 may prevent debris from entering the support rail 502 and servers to cover and protect the ends of the support rail 502.

Use of the interface body 222, including one or more components described herein, may allow the keyboard 200 to connect to the mobile computing device 120 and retain electrical connection with the mobile computing device 120. The interface body 222 may also allow for keyboard 200 and the mobile computing device 120 to be significantly smaller ("slimmer") compared to other detachable keyboards and computing devices.

As used in this application, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc., and/or may not include all of the devices, components, modules etc. discussed in connection with the figures. A combination of these approaches may also be used.

While implementations of the present disclosure have been described in connection with examples thereof, it will be understood by those skilled in the art that variations and modifications of the implementations described above may be made without departing from the scope hereof Other implementations will be apparent to those skilled in the art from a consideration of the specification or from a practice in accordance with examples disclosed herein.

What is claimed is:

1. A peripheral computing device, comprising:
an input portion configured to receive input for a computing device; and a device interface component connected to the input portion and configured to connect to the computing device, the device interface component comprising:
an electrical connection protrusion extending from the device interface component and configured to insert in a corresponding electrical receptacle of the computing device;
a magnetically connectable docking member configured to magnetically attract or to be magnetically attracted to a corresponding docking component on the computing device; and
a support rail configured to support the electrical connection protrusion and the magnetically connectable docking member,; and
wherein a first centerline of the magnetically connectable docking member is offset towards the input portion from a second centerline of the electrical connection protrusion to create a rotational motion for the electrical connection protrusion to engage with the corresponding electrical receptacle.

2. The peripheral computing device of claim 1, wherein the electrical connection protrusion includes a contact side having a plurality of electrical contacts for electrical connection with the computing device.

3. The peripheral computing device of claim 2, wherein at least a portion of the contact side is recessed to prevent shorting the peripheral computing device.

4. The peripheral computing device of claim 1, wherein the magnetically connectable docking member includes a flux fountain array.

5. The peripheral computing device of claim 1, wherein the support rail comprises one or more shoulders extending from a same surface of the device interface component as the electrical connection protrusion to form a concave portion along a length of the support rail and configured to define a pivot point to guide connecting the peripheral computing device with the computing device.

6. The peripheral computing device of claim 1, wherein the device interface component further comprises:
a wrap to cover at least a portion of the magnetically connectable docking member, the support rail, or the electrical connection protrusion.

7. A device interface component of a peripheral computing device, comprising:
an electrical connection protrusion configured to insert in a corresponding electrical receptacle of a computing device; a magnetically connectable docking member configured to magnetically attract or to be magnetically attracted to a corresponding docking component on the computing device; and
a support rail configured to support the electrical connection protrusion and the magnetically connectable docking member; and
wherein a first centerline of the magnetically connectable docking member is offset towards the input portion from a second centerline of the electrical connection protrusion to create a rotational motion for the electrical connection protrusion to engage with the corresponding electrical receptacle.

8. The device interface component of claim 7, wherein the electrical connection protrusion includes a contact side that is recessed and has a plurality of electrical contacts for electrical connection with the computing device.

9. The device interface component of claim 7, wherein the magnetically connectable docking member includes a flux fountain array having alternating polarized portions.

10. The device interface component of claim 7, wherein the support rail comprises two shoulders to form a concave portion along a length of the support rail and configured as guides for connecting the peripheral computing device with the computing device.

11. The device interface component of claim 7, further comprising:
a mechanical connection protrusion configured to insert in a corresponding receptacle of the computing device.

12. The device interface component of claim 7, further comprising:
a wrap to cover at least a portion of the magnetically connectable docking member, the support rail, or the electrical connection protrusion.

13. A computing device, comprising:
a mobile computing device portion comprising an electrical receptacle connected to electrical circuitry, a first magnetically connectable docking member mounted within the mobile computing device portion, and a mechanical receptacle mounted within the mobile computing device portion;
a peripheral computing device portion removably attachable to the mobile computing device portion via a device interface component; and the device interface component comprising:
an electrical connection protrusion extending from the device interface component and configured to insert into the electrical receptacle;
a second magnetically connectable docking member configured to magnetically attract or to be magnetically attracted to the first magnetically connectable docking member; and
a support rail configured to support the electrical connection protrusion and the second magnetically connectable docking member; and
wherein a first centerline of the second magnetically connectable docking member is offset towards the peripheral computing device portion from a second centerline of the electrical connection protrusion.

14. The computing device of claim 13, wherein the electrical connection protrusion includes a contact side that is recessed to prevent shorting the peripheral computing device portion.

15. The peripheral computing device of claim 1, wherein the magnetically connectable docking member or a north-south pole axis thereof is at an acute angle from a vertical axis of the support rail.

16. The peripheral computing device of claim 1, wherein the electrical connection protrusion includes electrical contacts that are elongated to provide a swipe length.

17. The device interface component of claim 7, wherein the magnetically connectable docking member or a north-south pole axis thereof is at an acute angle from a vertical axis of the support rail.

18. The device interface component of claim 7, wherein the electrical connection protrusion includes electrical contacts that are elongated to provide a swipe length to facilitate maintaining electrical connection between the peripheral computing device and the computer device when the peripheral computing device is in any one of multiple positions or transitioning between positions.

19. The computing device of claim 13, wherein the second magnetically connectable docking member or a north-south pole axis thereof is at an acute angle from a vertical axis of the support rail.

20. The computing device of claim 13, wherein the electrical connection protrusion includes electrical contact that are elongated to provide a swipe length in a range of 0.07 mm and 0.09 mm.

* * * * *